United States Patent
Kamisetty et al.

(10) Patent No.: US 10,601,727 B1
(45) Date of Patent: Mar. 24, 2020

(54) METHODS AND APPARATUS FOR EFFICIENT USE OF LINK AGGREGATION GROUPS

(71) Applicant: Juniper Networks, Inc., Sunnyvale, CA (US)

(72) Inventors: Jeevan Madhu Kamisetty, San Jose, CA (US); Lakshmana Murthy Mantha, Fremont, CA (US); Joseph L. White, San Jose, CA (US); Simon Jonathan Gordon, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1452 days.

(21) Appl. No.: 13/852,191

(22) Filed: Mar. 28, 2013

Related U.S. Application Data

(60) Provisional application No. 61/738,611, filed on Dec. 18, 2012.

(51) Int. Cl.
*H04L 12/803* (2013.01)
*H04L 12/917* (2013.01)

(52) U.S. Cl.
CPC ................... *H04L 47/76* (2013.01)

(58) Field of Classification Search
CPC ..... H04L 45/245; H04L 47/125; H04L 45/38; H04L 49/351; H04L 47/76; G06F 2201/84; G06F 3/0635
USPC ........................................................ 709/226
See application file for complete search history.

(56) References Cited

U.S. PATENT DOCUMENTS

| 6,996,615 B1* | 2/2006 | McGuire | G06F 9/505 709/224 |
| 2002/0054567 A1* | 5/2002 | Fan | H04L 47/11 370/230 |
| 2008/0291826 A1* | 11/2008 | Licardie | H04L 47/10 370/230 |
| 2011/0267947 A1* | 11/2011 | Dhar | H04L 47/125 370/235 |
| 2012/0177042 A1* | 7/2012 | Berman | H04L 12/4625 370/392 |

(Continued)

OTHER PUBLICATIONS

"Cisco Nexus 5000 Series NX-OS Operations Guide, Release 5.1(3)N1(1)," Chapter 4, © 2012 Cisco Systems, Inc., Jun. 11, 2012 (19 pages).

(Continued)

*Primary Examiner* — Tonia L Dollinger
*Assistant Examiner* — Jonathan A Sparks
(74) *Attorney, Agent, or Firm* — Cooley LLP

(57) ABSTRACT

A non-transitory processor-readable medium storing code representing instructions to be executed by a processor can cause the processor to receive an indication to load balance a group of sessions associated with a network node and a switch across a group of links between a gateway device and the switch at a first time. The code causes the processor to calculate at a second time, a load based on the group of sessions and associated with a first set of links in an active configuration before the first time. The code causes the processor to send a signal to cause a set of sessions from the group of sessions to re-establish themselves at a third time based on a threshold value calculated based on the load such that the set of sessions are load balanced across a second set of links in the active configuration at the third time.

18 Claims, 3 Drawing Sheets

(56) References Cited

U.S. PATENT DOCUMENTS

2014/0064056 A1* 3/2014 Sakata .................. H04L 41/00
370/216

OTHER PUBLICATIONS

Understanding Load Balancing in an FCoE-FC Gateway Proxy Fabric, Retrieved from internet, http://www.juniper.net/techpubs/en_US/junos12.1/topics/concept/fibre-channel-proxy-load-balancing-understanding.html, Published Mar. 23, 2012.

MOY, "OSPF Version 2", The Internet Society, https://www.ietf.org/rfc/rfc2328.txt Apr. 1998, 188 pgs.

* cited by examiner

400

402 Receive, an indication to load balance a group of sessions associated with a network node and a switch across a group of links between the gateway device and the switch at a first time.

404 Calculate, at a second time in response to the indication, a load based on the group of sessions associated with a first set of links in an active configuration before the first time.

406 Calculate, a threshold value based on the load.

408 Send, a signal to cause a set of sessions from the group of sessions to re-establish the set of sessions at a third time after the second time and based on the threshold value such that the set of sessions are load balanced across a second set of links in active configuration at the third time.

FIG. 4

METHODS AND APPARATUS FOR EFFICIENT USE OF LINK AGGREGATION GROUPS

CROSS REFERENCE TO RELATED APPLICATION

This application claims priority to and the benefit of U.S. Provisional Patent Application No. 61/738,611, filed Dec. 18, 2012, and entitled "Methods and Apparatus for Automated Load Rebalancing," which is incorporated herein by reference in its entirety.

BACKGROUND

Some embodiments described herein relate generally to methods and apparatus for automated load balancing and specifically to methods and apparatus for automated load balancing between multiple links between two devices in a network.

Some known Fibre Channel (FC) load balancing methods do not automatically redistribute an existing load across the links between a Fibre Channel over Ethernet (FCoE) gateway and a Fibre Channel (FC) switch when a new link becomes available. This can lead to overutilization of some links while newer links remain underutilized.

Accordingly, a need exists for methods and apparatus that automatically redistribute the load between two devices in a network when new links become available.

SUMMARY

In some embodiments, a non-transitory processor-readable medium storing code representing instructions to be executed by a processor can cause the processor to receive an indication to load balance a group of sessions associated with a network node and a switch across a group of links between a gateway device and the switch at a first time. The code causes the processor to calculate at a second time, a load based on the group of sessions and associated with a first set of links in an active configuration before the first time. The code causes the processor to calculate a threshold value based on the load and send a signal to cause a set of sessions from the group of sessions to re-establish themselves at a third time based on the threshold value such that the set of sessions are load balanced across a second set of links in the active configuration at the third time.

BRIEF DESCRIPTION OF THE DRAWINGS

FIG. 4 is a flowchart illustrating a method for load balancing a group of sessions associated with a network node and a switch across a group of links, according to an embodiment.

DETAILED DESCRIPTION

Figure 1:
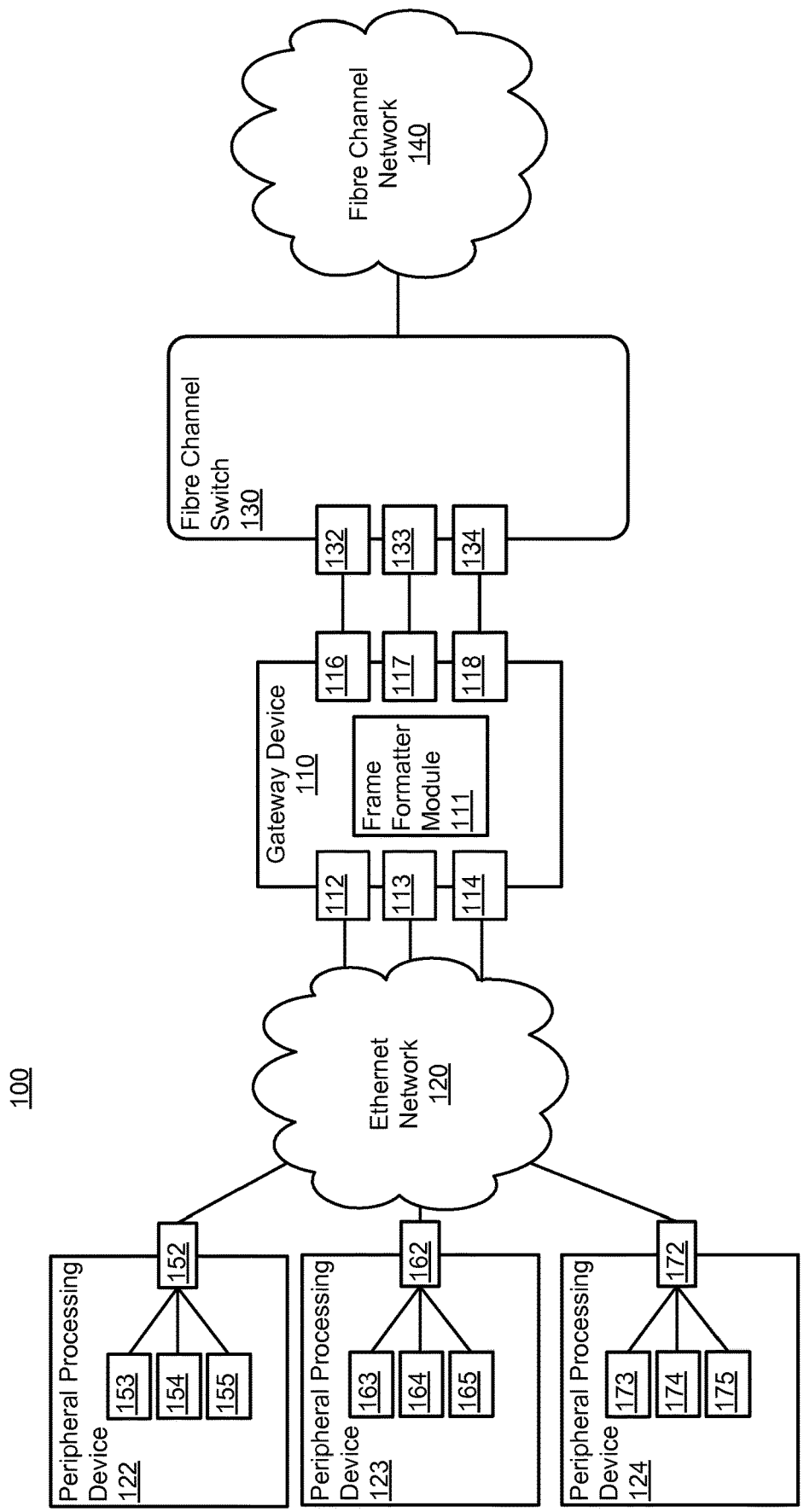
FIG. 1 is a schematic illustration of a mixed Ethernet and Fibre Channel portion of a computer network, according to an embodiment.

In some embodiments, a non-transitory processor-readable medium storing code representing instructions to be executed by a processor can cause the processor to receive, at a load balancing module, an indication to load balance a group of sessions associated with a network node and a switch across a group of links between a gateway device and the switch at a first time. In such embodiments, the code can cause the processor to calculate at a second time after the first time and in response to the indication, a load based on the group of sessions and associated with a first set of links (1) from the group of links and (2) in an active configuration before the first time, where the group of sessions is associated with the first set of links at the second time. In such embodiments, the code can cause the processor to calculate a threshold value based on the load and send a signal to cause a set of sessions from the group of sessions to re-establish the set of sessions at a third time after the second time and based on the threshold value such that the set of sessions are load balanced across a second set of links (1) from the group of links and (2) in the active configuration at the third time.

In some embodiments, an apparatus includes a gateway device configured to receive, at a first time, an indication to load balance across a group of links between the gateway device and a switch, a first group of sessions including sessions between a group of network nodes and the switch and a second group of sessions including sessions between a group of virtual ports and the switch. In such embodiments, each virtual port from the group of virtual ports is associated with a network node from the group of network nodes. In such embodiments, the gateway device is configured to calculate, at a second time after the first time and in response to the indication, a load based on the first group of sessions and the second group of sessions and associated with a set of links (1) from the group of links and (2) in the active configuration before the first time. In such embodiments, the gateway device is configured to calculate, based on the load, a group of link-session profiles associating each session from the first group of sessions with a link from the group of links. The gateway device is also configured to select a link-session profile from the group of link-session profiles based on the load balancing profile associated with the link-session profile. In such embodiments, the gateway device is configured to send a signal to cause a set of sessions from the first group of sessions to be reestablished at a third time after the second time and based on the link-session profile such that each session from the first group of sessions and each session from the second group of sessions are associated with a link from the group of links according to the link-session profile.

In some embodiments, an apparatus includes a gateway device configured to receive an indication of a link from a group of links between the gateway device and a switch, changing from an inactive configuration to an active configuration at a first time. In such embodiments, the gateway device is configured to calculate, at a second time after the first time, a load associated with a set of links (1) from the group of links and (2) in the active configuration before the first time. The load is based on a first group of sessions including sessions between a group of network nodes and the switch and a second group of sessions including sessions between a group of virtual ports and the switch. Each session from the second group of sessions is associated with a session from the first group of sessions. In such embodiments, the gateway device is configured to select a session from the first group of sessions based on that session being associated with a greater number of sessions from the second group of sessions than each remaining session from the first group of sessions. In such embodiments, the gateway device is configured to send a signal to cause that session from the first group of sessions to be re-established after the first time such that that session is associated with the link (e.g., that has the lowest load) from the group of links after the third time.

As used in this specification, the singular forms "a," "an" and "the" include plural referents unless the context clearly dictates otherwise. Thus, for example, the term "a peripheral processing device" is intended to mean a single peripheral processing device or multiple peripheral processing devices.

As used herein, a module can be, for example, any assembly and/or set of operatively-coupled electrical components associated with performing a specific function, and can include, for example, a memory, a processor, electrical traces, optical connectors, software (stored in memory and/or executing in hardware) and/or the like.

FIG. 1 is a schematic illustration of a mixed Ethernet and Fibre Channel portion of a computer network, according to an embodiment. More specifically, FIG. 1 illustrates a network portion 100 that includes a gateway device 110 physically and/or operatively coupled to peripheral processing devices 122-124 (via an Ethernet network 120 and Ethernet ports 112-114) and a Fibre Channel switch 130 (via Fibre Channel ports 116-118). The Fibre Channel switch 130 is operatively and/or physically coupled to the gateway device 110 via the Fibre Channel ports 132-134, and to a Fibre Channel network 140. The peripheral processing devices 122-124 are operatively and/or physically coupled to the gateway device 110 via the FCoE Ports 152, 162 and 172 (e.g., FCoE ENodes), respectively, and the Ethernet network 120. The FCoE ports 152, 162 and 172 (e.g., FCoE ENodes) are operatively coupled to the Virtual Fibre Channel N ports 153-155, 163-165 and 173-175, respectively.

The network portion 100 can be a combination of hardware and/or software (executing on hardware and/or stored in memory) configured to transmit data between any of the peripheral processing devices 122-124 and the Fibre Channel network 140 via the Ethernet network 120, the gateway device 110 and the Fibre Channel switch 130. The network portion 100 can be, for example, a portion of a data center fabric, local area network (LAN), wide area network (WAN), storage area network (SAN), intranet, and/or the Internet.

The gateway device 110 can be, for example, an FCoE gateway. In some configurations, the gateway device 110 can transmit data based at least in part on the Ethernet, Fibre Channel and/or FCoE network protocols via the Ethernet ports 112-114 and/or the Fibre Channel ports 116-118. In such configurations, the Ethernet ports 112-114 can be configured to send FCoE frames to and/or receive FCoE frames from any of the FCoE ports 152, 162 and 172 via the Ethernet network 120. In such configurations, the Fibre Channel ports 116-118 can be Fibre Channel ports configured to send Fibre Channel frames to and/or receive Fibre Channel frames from the Fibre Channel switch 130. As shown in FIG. 1, the gateway device 110 also includes a Frame Formatter Module 111 configured to format received FCoE, Ethernet and/or Fibre Channel frames for transmission to a network device or switch.

In some configurations, each virtual port associated with the Fibre Channel ports 116-118 can be associated with and/or correspond to one or more virtual ports 153-155, 163-165, and 173-175 of the peripheral processing devices 122-124. For example, a virtual port associated with the Fibre Channel port 116 can be configured to send data to and/or receive data from the virtual port 153 and a virtual port associated with the Fibre Channel port 117 can be configured to send data to and receive data from the virtual port 163. Moreover, in some configurations, each FCoE port 152, 162 and 172 (e.g., FCoE ENodes) can be associated with a Fibre Channel port 116-118. In such configurations, for example, FCoE port 152 can be associated with Fibre Channel port 116 and FCoE port 162 can be associated with Fibre Channel port 117. In some instances, as described in further detail herein, each virtual port 153-155, 163-165, 173-175 is associated with the Fibre Channel port 116-118 that is associated with its FCoE port 152, 162, 172. In other instances, each virtual port 153-155, 163-165, 173-175 is not necessarily associated with the Fibre Channel port 116-118 that is associated with its associated FCoE port 152, 162, 172.

In some configurations, each FCoE port 152, 162, 172 is associated with a Fibre Channel port 116-118 in response to logging into the Fibre Channel switch 130 using a Fabric Login (FLOGI) signal. Similarly, each virtual port 153-155, 163-165, 173-175 can be associated with a Fibre Channel port 116-118 in response to logging into the Fibre Channel switch 130 using a Fabric Discovery (FDISC) signal.

In some instances, the load assignments to the Fibre Channel ports 116-118 can be distributed across the Fibre Channel ports 116-118. Similarly stated, the load being sent from the gateway device 110 to the Fibre Channel switch 130 can be balanced by the gateway device 110. In some instances and as described in further detail herein, the gateway device 110 can load balance on a per-FCoE-Port 152, 162, 172 basis (i.e., on an ENode or FLOGI basis). In such instances, the gateway device 110 can assign or attempt to assign each FCoE port 152, 162, 172 (i.e., each FLOGI) and its associated virtual ports 153-155, 163-165, 173-175 (i.e., each FDISC) to a Fibre Channel port 116-118 such that the assignment of the FCoE ports 152, 162, 172 are substantially balanced across the Fibre Channel ports 116-118. For example, FCoE port 152 (and its associated virtual ports 153-155) can be associated with Fibre Channel port 116, FCoE port 162 (and its associated virtual ports 163-165) can be associated with Fibre Channel port 117 and FCoE Port 172 (and its associated virtual ports 173-175) can be associated with Fibre Channel port 118. In such instances, the FCoE ports 152, 162, 172 are taken into account to load balance across the Fibre Channel ports 116-118, and the virtual ports 153-155, 163-165, 173-175 are not taken into account when load balancing or load rebalancing. Similarly stated, load balancing across Fibre Channel ports 116-118 is based on FLOGIs and not FDISCs.

In other instances, the virtual ports 153-155, 163-165, 173-175 are load balanced in addition to the FCoE ports 152, 162, 172. In such instances, each virtual port 153-155, 163-165, 173-175 and each FCoE port 152, 162, 172 is separately assigned a Fibre Channel port 116-118. Thus, a virtual port 153-155, 163-165, 173-175 is not necessarily assigned to the same Fibre Channel port 116-118 as its associated FCoE port. For example, virtual port 153 can be assigned to Fibre Channel port 116 and FCoE port 152 can be assigned to Fibre Channel port 117. In such instances, the load balancing across the Fibre Channel ports 116-118 is based on both FLOGIs and FDISCs.

In still other instances, the load rebalancing across the Fibre Channel ports 116-118 can be based on bandwidth requirements of the virtual ports 153-155, 163-165, 173-175 and/or the FCoE ports 152, 162 and 172. In such instances, the bandwidth requirements of a virtual port 153-155, 163-165, 173-175 and/or an FCoE port 152, 162, 172 is used to assign a Fibre Channel port 116-118. Additional details regarding the mixed Ethernet and Fibre Channel portion of a computer network are shown and described in U.S. patent application Ser. No. 13/838,082, filed on Mar. 15, 2013, and entitled "Methods and Apparatus for Load Balancing Communication Sessions", which is incorporated herein by reference in its entirety.

In some instances, each of the Ethernet ports 112-114 can be a physical Ethernet port configured to exchange data with any of the peripheral processing devices 122-124 via the Ethernet network 120 and the FCoE ports 152, 162 and 172, respectively. Although not shown in FIG. 1, in some instances, each of the Ethernet ports 112-114 can be physically coupled to one of multiple Ethernet network interface cards (NICs) included in the gateway device 110.

As shown in FIG. 1, each of the Fibre Channel ports 116-118 is uniquely coupled to one of the Fibre Channel ports 132-134 of the Fibre Channel switch 130. In some instances, each of the Fibre Channel ports 116-118 can be a physical Fibre Channel port configured to allow exchange of one or more Fibre Channel frames between the gateway device 110 and the Fibre Channel switch 130.

In some instances, the frame formatter module 111 can be any hardware-based module and/or software-based module (executing in hardware and/or stored in memory) configured to (1) encapsulate received Fibre Channel frames within FCoE frames for transmission via the Ethernet network 120 and/or (2) extract Fibre Channel frames from received FCoE frames for transmission to the Fibre Channel switch 130. In some instances, the frame formatter module 111 can be and/or can function similar to a converged network adaptor (CNA).

Although not shown in FIG. 1, the gateway device 110 can include or store one or more data structures indicating one or more switching policies, rules and/or filters. For example, in some configurations, the gateway device 110 can include and/or be operatively coupled to a memory storing a switching table and/or filter database (not shown in FIG. 1) used by the gateway device 110 when switching data units such as, for example, a data frame and/or a data packet (e.g., an Ethernet or FCoE frame and/or packet) to one or more of the peripheral processing devices 122-124 and/or the Fibre Channel switch 130. Accordingly, the gateway device 110 can serve as a gateway between the peripheral processing devices 122-124 and the Fibre Channel switch 130, allowing for the transmission of FCoE frames from the peripheral processing devices 122-124 to the Fibre Channel switch 130, and for the transmission of Fibre Channel frames from the Fibre Channel switch 130 to any of the peripheral processing devices 122-124.

In some configurations, the gateway device 110 can be physically located within the same physical chassis as the Fibre Channel switch 130. In some configurations, the gateway device 110 can function as both an FCoE gateway and a Fibre Channel switching device. Alternatively, as shown in FIG. 1, the gateway device 110 and the Fibre Channel switch can be located within different chassis.

The Ethernet network 120 can be any combination of network hardware devices and/or software modules (executing in hardware and/or stored in memory) that together comprise an Ethernet network. The Ethernet network 120 can include, for example, one or more Ethernet-compatible switches, routers, peripheral devices, servers, line cards and/or network interface cards (NICs). In some configurations, the Ethernet network 120 can include one or more devices and/or modules physically and/or operatively coupled via cable (e.g., Category 5 cable) and/or one or more wireless connections. In other configurations, the peripheral processing devices 122-124 are directly coupled to the gateway device 110 (i.e., without any intervening devices and/or modules).

As shown in FIG. 1, the Ethernet network 120 is operatively and/or physically coupled to each of the peripheral processing devices 122-124 via the FCoE ports 152, 162 and 172, respectively. Although not shown in FIG. 1, in some configurations, any or all of the peripheral processing devices 122-124 can be included in the Ethernet network 120. In some instances, the Ethernet network 120 can transmit one or more FCoE frames to one or more of the peripheral processing devices 122-124. The one or more FCoE frames (not shown in FIG. 1) can include encapsulated Fibre Channel frames originally sent from the Fibre Channel network 140 and/or the Fibre Channel switch 130. Additionally, the Ethernet network 120 can optionally receive one or more FCoE and/or Ethernet frames from any of the peripheral processing devices 122-124 for transmission to the Fibre Channel switch 130 and/or the Fibre Channel network 140 via the gateway device 110.

Each of the peripheral processing devices 122-124 can be any combination of hardware and/or software (executing in hardware and/or stored in memory) capable of transmitting information to and/or receiving information from the gateway device 110 via the Ethernet network 120. In some embodiments, one or more of the peripheral processing devices 122-124 can be a server device, an application server, a database system, a storage device, a gateway, a workstation, a compute device and/or the like. Each of the peripheral processing devices 122-124 can optionally be, for example, compute nodes, service nodes, routers, and/or storage nodes. In some embodiments, one or more of the peripheral processing devices 122-124 can perform one or more computing tasks, such as one or more data storage, software-as-a-service (SAS), web service, content request, or other computing tasks. In some instances, one or more of the peripheral processing devices 122-124 can be a Fibre Channel-based device operatively and/or physically coupled to one or more other Fibre Channel-based devices, such as a Fibre Channel switch, a Fibre Channel fabric, a storage area network (SAN), etc.

As shown in FIG. 1, the peripheral processing devices 122-124 can include the FCoE ports 152, 162 and 172 (e.g., FCoE ENodes), respectively, and the Virtual Fibre Channel N ports 153-155, 163-165 and 173-175 (e.g., FCoE VN ports), respectively. In some instances, each of the Virtual Fibre Channel N ports 153-155, 163-165 and 173-175 can be configured to send one or more Fibre Channel frames for encapsulation within an FCoE frame and for subsequent transmission by the corresponding FCoE port from the FCoE Ports 152, 162 and 172. The corresponding FCoE port from the FCoE Ports 152, 162 and 172 can transmit the FCoE frame to the gateway device 110 via the Ethernet network 120. Each of the Virtual Fibre Channel N ports 153-155, 163-165 and 173-175 can also be configured to receive one or more Fibre Channel frames that have been extracted and/or decapsulated from one or more FCoE frames, each of the FCoE frames having been received by the corresponding FCoE port from the FCoE ports 152, 162 and 172 via the Ethernet network 120.

In some instances, the peripheral processing devices 122-124 can be in communication with the Ethernet network 120 via any suitable connection such as, for example, an optical connection (e.g., an optical cable and optical connectors), an electrical connection (e.g., an electrical cable and electrical connectors) and/or the like. Similarly stated, each of the FCoE ports 152, 162 and 172 can provide a communication interface through which a peripheral processing device 122-124 can be operatively coupled to the Ethernet network 120.

As such, the peripheral processing devices 122-124 are configured to send data units (e.g., Ethernet frames, FCoE frames, data frames, data cells, data packets, etc.) to and receive data units from the Ethernet network 120. In some configurations, each connection between the peripheral processing devices 122-124 and the Ethernet network 120 is a direct link. Such a link can be said to be a single physical hop link. In other configurations, the peripheral processing devices 122-124 can be operatively coupled to the Ethernet network 120 via intermediate modules or devices. Such a connection can be said to be a multiple physical hop link.

In some configurations, any combination of the peripheral processing devices 122-124 can be physically located within the same physical chassis or rack as one another and/or any other device included in the Ethernet network 120. In other configurations, each of the peripheral processing devices 122-124 can be located within different chassis or racks.

The FCoE ports 152, 162 and 172 can be physical Ethernet ports capable of sending and/or receiving one or more Ethernet and/or FCoE frames. In some configurations, each of the FCoE ports 152, 162 and 172 can be associated with and/or located on a physical line card (not shown in FIG. 1), such as an Ethernet NIC. In some configurations, each of the FCoE ports 152, 162 and 172 can include and/or be associated with a frame formatter module (not shown in FIG. 1) included in each of the peripheral processing devices 122-124, respectively. These frame formatter modules can each be configured to encapsulate Fibre Channel frames received from a virtual Fibre Channel N port within FCoE frames for transmission via the Ethernet network 120. In such configurations, such frame formatter modules can be further configured to decapsulate and/or extract Fibre Channel frames from within FCoE frames received via the Ethernet network 120. In some other configurations, the FCoE ports 152, 162 and 172 can also initiate and send FCoE frames to the gateway device 110 via the Ethernet network 120 that are not received from the virtual ports 153-155, 163-165, 173-175.

The Virtual Fibre Channel N ports 153-155, 163-165 and 173-175 can be virtual Fibre Channel N ports similar to those generally associated with Fibre Channel and/or FCoE networks. In some configurations, one or more of the Virtual Fibre Channel N ports 153-155, 163-165 and 173-175 can constitute one of two virtual end nodes that define a virtual link. In such configurations, each such Virtual Fibre Channel N port can each be operatively coupled to a Virtual Fibre Channel F port from (not shown in FIG. 1) instantiated at the Fibre Channel switch 130.

The Fibre Channel switch 130 can be any combination of hardware and/or software (executing in hardware and/or stored in memory) configured to perform switching of Fibre Channel frames received from the gateway device 110 and/or the Fibre Channel network 140. As shown in FIG. 1, the Fibre Channel switch 130 is situated between the gateway device 110 and the Fibre Channel network 140, and can be configured to perform known switching tasks on Fibre Channel frames and/or packets transmitted between the gateway device 110 and the Fibre Channel network 140. In some instances, the Fibre Channel switch 130 can be a Fibre Channel forwarder (FCF). As also shown in FIG. 1, the Fibre Channel switch 130 includes Fibre Channel ports 132-134, each of which is operatively and/or physically coupled to one of the Fibre Channel ports 116-118 on the gateway device 110. In some instances, each of the Fibre Channel ports 132-134 can be a Fibre Channel port configured to exchange one or more Fibre Channel frames with a single Fibre Channel port from the Fibre Channel ports 116-118.

In some instances, the Fibre Channel switch 130 can perform initialization and/or login functions for a Fibre Channel and/or an FCoE network. For example, in some instances, the gateway device 110 can receive initialization requests from the Virtual Fibre Channel N ports 153-155 according to a standard protocol such as an FCoE initialization protocol (FIP). In such instances, the gateway device 110 can decapsulate the initialization request and send fabric login (FLOGI) signals to the Fibre Channel switch 130 for each Fibre Channel port 116-118. In response to receiving such initialization requests, the Fibre Channel switch 130 can assign a virtual port and/or physical port (e.g., Fibre Channel ports 116-118) a Fibre Channel identifier (FCID) and/or the like. Additionally, the Fibre Channel switch 130 can send the gateway device 110 a logical identifier (e.g., a logical World Wide Name (WWN)) of the Fibre Channel F port 132-134 to which the initialization signal was sent. This logical identifier can be associated with a Fibre Channel port 116-118 of the gateway device 110.

Additionally, the Fibre Channel switch 130 can receive initialization requests and/or fabric discovery (FDISC) signals for each Virtual Fibre Channel N port 153-155, 163-165, and 173-175. Based on the FDISC signals, the Fibre Channel switch 130 can provide each Virtual Fibre Channel N port 153-155, 163-165, and 173-175 with a Fiber Channel ID (FCID). Additionally, the Fibre Channel switch 130 can send the gateway device 110 a logical identifier (e.g., a logical WWN) of the Fibre Channel F port 132-134 to which the initialization requests and/or FDISC signals were sent. For example, if the gateway device 110 sends an initialization request to the Fibre Channel F port 132 for the Virtual Fibre Channel N port 153, the Fibre Channel switch 130 can send a logical identifier of the Fibre Channel F port 132 to the gateway device 110. The gateway device 110 can then send the logical identifier of the Fibre Channel F port 132 to the peripheral processing device 122 such that the peripheral processing device 122 can use the logical identifier of the Fibre Channel F port 132 when addressing data units such as, for example, data packets and/or data frames to be sent to the Fibre Channel switch 130. Additional details regarding the login and/or initialization signals are shown and described in U.S. patent application Ser. No. 12/976,200, filed on Dec. 22, 2010, and entitled "Apparatus and Methods to Aggregate FCOE (Fibre Channel over Ethernet) Filter Rules of a Single Interface in a Single or Few Rules on a First-Hop FCoE Networking Element," and U.S. patent application Ser. No. 12/976,222, filed on Dec. 22, 2010, and entitled "Methods and Apparatus for Providing Unique MAC Address to Individual Node For Fibre Channel Over Ethernet (FCOE) Traffic," each of which is incorporated herein by reference in its entirety.

In some instances, the Fibre Channel switch 130 can include multiple physical devices. In some instances, the Fibre Channel switch 130 can include a Fibre Channel switch fabric, such as a multi-stage Fibre Channel fabric. In such instances, the Fibre Channel switch 130 can be included in, for example, a data center, and can be define one or more logical hierarchical elements, such as virtual data center fabrics (VDCFs) and/or virtual local area networks (VLANs).

The Fibre Channel network 140 can be any combination of hardware devices and/or software modules (executing in hardware and/or stored in memory) that together comprise a Fibre Channel network. For example, although not shown in FIG. 1, the Fibre Channel network 140 can include one or more Fibre Channel-compatible servers and/or peripheral devices connected to one or more Fibre Channel switching devices including one or more host bus adapters (HBAs). In some configurations, the Fibre Channel Network 140 can include one or more subnetwork portions, such as one or more Fibre Channel zones and/or storage area networks (SANs). As shown in FIG. 1, the Fibre Channel network 140 can be operatively coupled to the peripheral processing devices 122-124 via the Ethernet network 120, the gateway device 110 and the Fibre Channel switch 130. In such configurations, the Fibre Channel network 140 can thus exchange data units with the peripheral processing devices 122-124.

In some instances, a Fibre Channel over Ethernet (FCoE) gateway (e.g., gateway device 110 of FIG. 1) supports automatic selection of Fibre Channel (FC) links (e.g., Fibre Channel ports 116-118 shown in FIG. 1) connected to the FC switch (e.g., Fibre Channel switch 130 shown in FIG. 1). When a new session with an FCoE ENode (e.g., ports 152, 162, 172) is initiated (e.g., via a FLOGI), the FC interface with the smallest load is selected from the available FC links. In some instances, when a new FC link interface becomes operational, the existing load can be redistributed automatically to include the newly-available FC link as described in greater detail herein. Additionally, sessions that are initiated after the new FC link becomes operational can also select the new FC link.

In known mixed Ethernet and Fibre Channel computer networks, FCoE gateway devices (e.g., gateway device 110 in FIG. 1) typically support automatic selection of FC links connected to the FC switch. When a new session is initiated, one of the existing FC interface (or port) is selected from the FC links based on a load balancing method configured and implemented by the user (e.g., a network administrator). Typically, when a new FC link becomes operational, the existing load is not redistributed automatically to include the new available FC link. Hence, some links can remain under-utilized and other links are over-utilized. In contrast to these known networks, the various load balancing methods discussed in detail herein attempt to redistribute existing communication sessions across all available FC links automatically and can be useful to automatically load balance existing sessions when a new FC link becomes operational (where the load balancing includes the newly operational FC link). In some instances, such load balancing methods can also be manually triggered by, for example, a network administrator to distribute sessions to FC links as they become operational.

Figure 2:
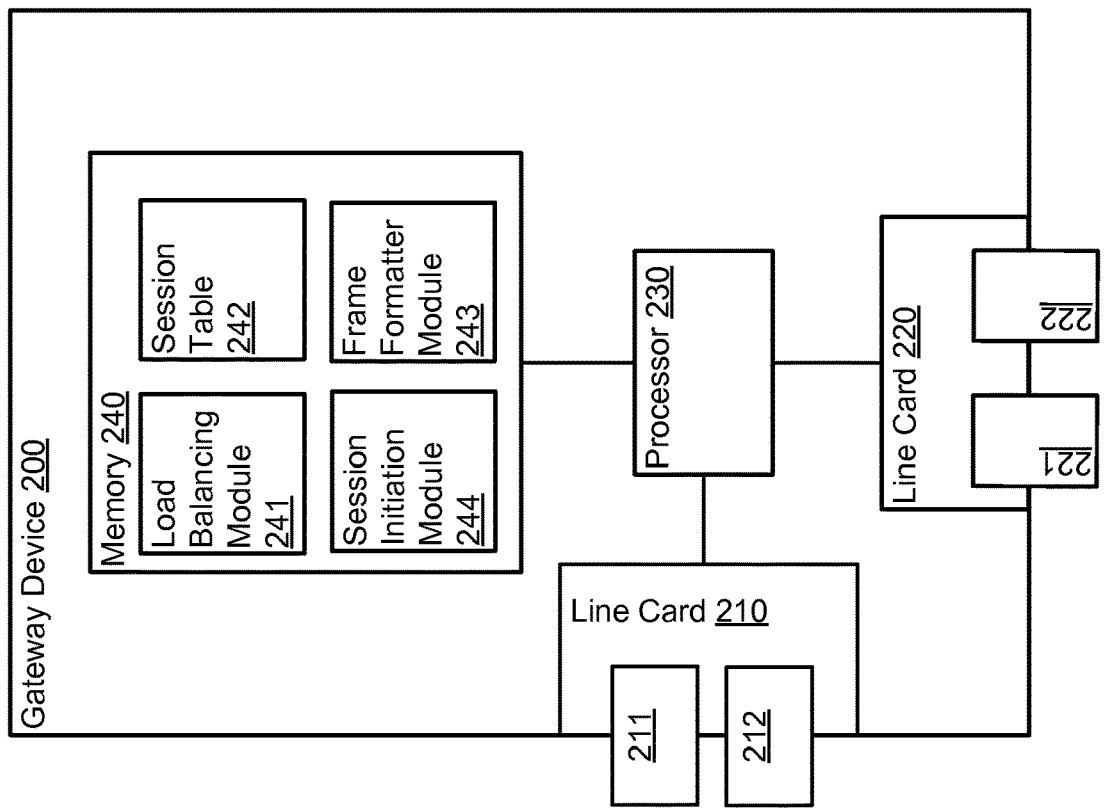
FIG. 2 is a schematic illustration of a gateway device of a mixed Fibre Channel/Ethernet network portion, according to an embodiment.

FIG. 2 is a schematic illustration of a gateway device of a mixed Fibre Channel/Ethernet network portion, according to an embodiment. More specifically, FIG. 2 is a system block diagram of a gateway device 200, similar to the gateway device 110 described in connection with FIG. 1 above. The gateway device 200 includes a processor 230, a memory 240, a line card 210 and a line card 220. The memory 240 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 240 can store instructions to cause the processor 230 to execute modules, processes and/or functions associated with the gateway device 200. The memory 240 includes a load balancing module 241, a session table 242, a frame formatter module 243 and a session initiation module 244.

The line card 210 includes the physical ports 211 and 212, and the line card 220 includes the physical ports 221 and 222. The processor 230 can be, for example, a general purpose processor, a Field Programmable Gate Array (FPGA), an Application Specific Integrated Circuit (ASIC), a Digital Signal Processor (DSP), and/or the like. The processor 230 can be configured to run and/or execute application processes and/or other modules, instructions, processes and/or functions associated with the gateway device 200. The processor 230 is operatively coupled to the memory 240, the line card 210 and the line card 220. In some instances, the line cards 210 and/or 220 can include one or more processors and/or memories (not shown in FIG. 2). The gateway device 200 is configured to receive a Fibre Channel over Ethernet (FCoE) data unit from a Virtual Fibre Channel N port (e.g., Virtual Fibre Channel N ports 153-155, 163-165, 173-175 in FIG. 1). The gateway device 200 is configured to reformat the FCoE data unit into a Fibre Channel (FC) data unit, and to send the FC data unit to the Fibre Channel switch via a link based on the communication session of the Virtual Fibre Channel N port being associated with the link.

Similar to the Ethernet ports 112-114 of the gateway device 110 (shown in FIG. 1), the Physical Ports 211-212 and 221-222 can be configured to communicate with Ethernet devices and/or Fibre Channel peripheral processing devices via an Ethernet network. Additionally or alternatively, similar to the Fibre Channel ports 116-118 (shown in FIG. 1), the physical ports 211-212 and 221-222 can be configured to communicate with Fibre Channel devices, such as Fibre Channel switches. For example, the physical ports 211-212 and 221-222 can implement a physical layer using twisted-pair electrical signaling via electrical cables or fiber-optic signaling via fiber-optic cables. In some instances, some of the physical ports 211-212 and 221-222 can implement one physical layer such as twisted-pair electrical signaling, and others of the physical ports 211-212 and 221-222 can implement a different physical layer, such as fiber-optic signaling. Furthermore, the physical ports 211-212 and 221-222 can be configured to allow the gateway device 200 to communicate with peripheral processing devices and/or switching devices via a common protocol such as Ethernet, Fibre Channel and/or FCoE. In some configurations, some of the physical ports 211-212 and 221-222 can implement one protocol such as Ethernet/FCoE and in other configurations, the physical ports 211-212 and 221-222 can implement a different protocol such as Fibre Channel. Thus, the gateway device 200 can be in communication with multiple peripheral processing and/or switching devices using homogeneous or heterogeneous physical layers and/or protocols via the physical ports 211-212 and 221-222.

The gateway device 200 can be operatively coupled to a switch (e.g., a Fibre Channel switch) via a set of links. The gateway device 200 can operatively couple a network node (e.g., an FCoE ENode) during a communication session with the switch. The gateway device 200 can store an association between the communication session of the network node and a link from the set of multiple links such that data sent via the communication session of the network node is sent via the link. The gateway device 200 can receive from a virtual port (e.g., a Virtual Fibre Channel N ports) associated with the network node a login request (e.g., an FDISC request). The gateway device 200 can send, based on the login request from the virtual port, a login request to the switch to initiate a communication session between the virtual port and the switch. In some configurations (e.g., during ENode-based and FLOGI-based load balancing as described in greater detail herein), the gateway device 200 can also associate the communication session of the virtual port with the link from the set of links based on the communication session of the network node being associated with the link. In other configurations, the gateway device 200 can associate the communication session of the network node with the link based on at least one of a bandwidth of each link from the set of links or a number of sessions associated with each link from the set of links. In such configurations, the session between the network node and the switch with the selected link is based on the selected link having a greater amount of available bandwidth than each remaining link from the set of links and/or the selected link being associated with a number of sessions less than a number of sessions associated with each remaining link from the set of links.

In some instances, the gateway device 200 can be configured to prepare a data unit such as, for example, a data frame and/or a data packet (e.g., an Ethernet or FCoE frame and/or packet) for transmission to a peripheral processing device (e.g., one of the peripheral processing devices 122-124) or a Fibre Channel device (e.g., the Fibre Channel switch 130). For example, the frame formatter module 243 can be configured to forward, classify, and/or modify the frame encapsulation (e.g., modify, add and/or remove a header portion, footer portion and/or any other identifier included within the data frame) of a data frame prior to sending the data frame to a peripheral processing device or a Fibre Channel device. The frame formatter module 243 can be similar to the frame formatter module 111 shown in FIG. 1. The frame formatter module 243 can also be configured to partition and/or divide the data frame into data cells (e.g., having fixed length payloads) prior to sending the data cells to the Fiber Channel switch and/or Fiber Channel network. Further discussions about the frame formatter module 243 are included below. Additional details related to frame and/or packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

In some instances, the gateway device 200 can include a control plane module and/or portion (not shown in FIG. 2). In such instances, the control plane module and/or portion can store and/or maintain state associated with the Physical ports 211-212 and 221-222. For example, the control plane module and/or portion can maintain a database storing an association between the physical ports 211-212 and 221-222 and their associated virtual ports at the gateway device 200. Additionally, in some instances, and as described in further detail herein, the control plane module and/or portion can send control signals to and/or receive control signals from a control plane module and/or portion of a Fibre Channel switch (e.g., Fibre Channel switch 300, described in further detail herein).

The gateway device 200 includes a load balancing module 241. The load balancing module 241 can be implemented in a gateway device 200 that is operatively coupled to a Fibre Channel switch via a set of links. The load balancing module 241 can associate a communication session between a network node and the switch (e.g., Fibre Channel switch 130 in FIG. 1) with a link from the set of links such that data units of the communication session between the network node and the switch are sent between the gateway device 200 and the switch via the link.

Additionally, the load balancing module 241 can also be configured to receive an indication of a communication session between the virtual port and the switch. In some instances, the load balancing module 241 can associate the communication session between the virtual port and the switch with the link from the set of links based on the communication session between the network node and the switch being associated with the link. In other instances, the load balancing module 241 can associate the communication session between the virtual port and the switch with the link from the set of links that is independent of the communication session between the network node and the switch. The gateway device 200 can also include a session initiation module 244 that is operatively coupled to the load balancing module 241. The session initiation module 244 is configured to receive, from a virtual port associated with the network node, a request to login to the switch (e.g., Fibre Channel switch 130 in FIG. 1). The session initiation module 244 is configured to send, based on the request, a login signal to the switch such that the switch initiates a communication session between the virtual port and the switch.

The gateway device 200 includes a frame formatter module 243. The frame formatter module 243 can be any hardware-based module and/or software-based module (executing in hardware and/or stored in memory) that is configured to (1) encapsulate received Fibre Channel frames within FCoE frames for transmission via the Ethernet network and/or (2) extract (or decapsulate) Fibre Channel frames from received FCoE frames for transmission to the Fibre Channel switch (e.g., Fibre Channel switch 130 in FIG. 1). The frame formatter module 243 can be configured to encapsulate Fibre Channel frames received from a virtual Fibre Channel N port within FCoE frames for transmission via an Ethernet network (e.g., Ethernet network 120 in FIG. 1). In such instances, the frame formatter module 243 can be further configured to decapsulate and/or extract Fibre Channel frames from within FCoE frames received via the Ethernet network.

The gateway device 200 also includes a session table 242. The session table 242 can be any hardware-based module and/or software-based module (executing in hardware and/or stored in memory) that can store information on communication sessions between a network node and a switch and information on communication sessions between a virtual port and a switch (e.g., Fibre Channel switch 130 in FIG. 1). The session table 242 can contain entries pertaining to communication sessions such as, for example, the ENode number involved in the session, a session number, a link number, the virtual port number involved in the session, the Ethernet port number involved in the session, the Fibre Channel port (F-port) number involved in the session, and/or the like.

In some instances, the gateway device 200 can be configured to define one or more filters, switching policies and/or rules that dictate how and to where data frames and/or packets are transmitted by the gateway device 200. For example, the gateway device 200 can also include a filter module (not shown in FIG. 2) stored in the memory 240 that can be configured to define a filter stipulating that data frames received from a particular logical and/or physical address should in turn be sent to a device or module having a specified logical and/or physical address. Alternatively, such a filter module can define a filter stipulating that data frames of a particular type (such as FCoE, Ethernet, or Fibre Channel) and/or having a particular priority indicator should be sent via one of a specified set of ports (such as one of the Fibre Channel ports 116-118 shown in FIG. 1). In some instances, the gateway device 200 can be configured to route data frames and/or packets according to one or more filters.

Figure 3:
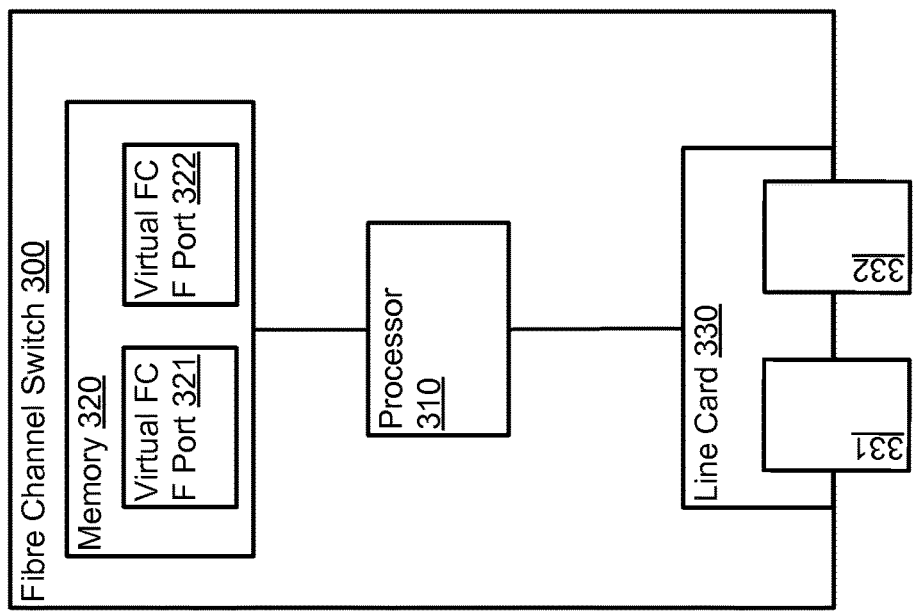
FIG. 3 is a schematic illustration of a Fibre Channel switch, according to an embodiment.

FIG. 3 is a schematic illustration of a Fibre Channel switch, according to an embodiment. More specifically, FIG. 3 is a system block diagram of a Fibre Channel switch 300 substantially similar to the Fibre Channel switch 130 described in connection with FIG. 1 above. The Fibre Channel switch 300 includes a Processor 310, a memory 320, and a line card 330. The line card 330 includes Fibre Channel ports 331 and 332. The memory 320 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 320 can store instructions to cause the processor 310 to execute modules, processes and/or functions associated with the Fibre Channel switch 300. The memory 320 includes or maintains Virtual Fibre Channel F port 321 and Virtual Fibre Channel F port 322 and/or the information used to maintain these virtual ports.

The processor 310 can be, for example, a general purpose processor, a Field Programmable Gate Array (FPGA), an Application Specific Integrated Circuit (ASIC), a Digital Signal Processor (DSP), and/or the like. The processor 310 can be configured to run and/or execute application processes and/or other modules, instructions, processes and/or functions associated with the Fibre Channel switch 300. The processor 310 is operatively coupled to the memory 320 and the line card 330. The Fibre Channel switch 300 can communicate with other Fibre Channel devices, such as an FCoE gateway (similar to the gateway device 110 shown in FIG. 1), via the Fibre Channel ports 331 and 332 in the line card 330.

In some instances, the Fibre Channel switch 300 can perform typical network switching functions on Fibre Channel frames. The Fibre Channel switch 300 can, for example, receive a Fibre Channel frame from a gateway device and route that Fibre Channel frame to an appropriate next-hop device within a Fibre Channel network to which the Fibre Channel switch 300 is operatively coupled. In some instances, the Fibre Channel switch 300 can communicate with one or more peripheral processing devices (e.g., one of the peripheral processing devices 122-124 in FIG. 1) via the Virtual Fibre Channel F port 321 and/or the Virtual Fibre Channel F port 322. For example, the Fibre Channel switch 300 can send a Fibre Channel frame from the Virtual Fibre Channel F port 321 for ultimate transmission to a Virtual Fibre Channel N port instantiated at a peripheral processing device (e.g., the Virtual Fibre Channel N port 173 instantiated at the peripheral processing device 124 in FIG. 1).

In some instances, the Fibre Channel switch 300 can be configured to perform Fibre Channel login and/or initialization procedures. In some instances, the Fibre Channel switch 300 can receive a FLOGI and/or an FDISC signal from a Fibre Channel port and/or device (e.g., a virtual Fibre Channel N port, a physical Fibre Channel port, a peripheral processing device, etc.). In response to receiving the FLOGI and/or FDISC signal, the Fibre Channel switch 300 can provide the Fibre Channel port and/or device with a logical and/or physical identifier (e.g., an FCID, a logical WWN associated with the virtual Fibre Channel port 321-322 on which the login was performed, etc.).

In some instances, the Fibre Channel switch 300 includes a control plane module and/or portion (not shown in FIG. 3). In such instances, the control plane module and/or portion can store and/or maintain state information associated with the Fibre Channel ports 331 and 332. For example, the control plane module and/or portion can maintain a database storing an association between the Fibre Channel ports 331 and 332 and their associated Virtual Fibre Channel F ports 321, 322 at the Fibre Channel switch 300. Additionally, in some instances, and as described in further detail herein, the control plane module and/or portion can send control signals to and/or receive control signals from a control plane module and/or portion of a gateway device (e.g., gateway device 200, shown and described with respect to FIG. 2).

In some configurations or modes, when a new FC link becomes operational (becomes activated), the existing sessions are not disturbed across the newly operational FC link. Sessions initiated after the new FC link becomes operational can use this new FC link. For example, sixty sessions can be uniformly distributed across three FC links (twenty sessions per FC link). Following this example, when a fourth FC link is initiated, none of the existing sixty sessions are re-assigned to the fourth FC link.

In some other configurations or modes, an automated load balancing feature is enabled, such that when a new FC link becomes operational, the existing sessions can be redistributed substantially uniformly across all the available FC uplinks. Sessions are moved from one FC interface to another, which can be performed by logging out those sessions and forcing the peripheral processing device (e.g., a server) to perform a new login. This can be a disruptive event because the sessions are removed and re-established again (only upon re-login by the peripheral processing devices). The level of disruption depends on the number of sessions being affected. Based on the existing load balancing configuration or mode, multiple approaches can be implemented each with different complexities and levels of disruption, which is discussed in greater detail herein.

In the mixed Ethernet and Fibre Channel portion of a computer network as described in FIG. 1 above, three modes of load balancing that can be supported that include for example: (1) session-based load balancing; (2) ENode-based load balancing and, (3) FLOGI-based load balancing. The load on an FC link (e.g., links defined by FC ports 116-118 in FIG. 1) typically can be defined as the number of FLOGI and FDISC sessions using that FC link. Each mode of load balancing can be implemented in multiple embodiments and is described in greater detail below.

Session-based load balancing includes assigning a new session to the least loaded FC link. The sessions include sessions initiated by a Fibre Channel over Ethernet (FCoE) fabric login (FLOGI) requests and sessions initiated by a Fibre Channel over Ethernet (FCoE) fabric discovery (FDISC) requests. In this mode, the load on a link is calculated as the number of sessions (FLOGI+FDISC) on that link. Any new login (FLOGI or FDISC) will be assigned to the link with the least load. Two embodiments for session-based load balancing are discussed below.

First, session-based load balancing can disrupt all current sessions. In this embodiment, the load balancing module at a gateway device (e.g., gateway device 110 in FIG. 1) can receive an indication signal to load balance a group of sessions associated with a network node and a switch across a group of links between a gateway device and the switch. This indication signal can also be called a rebalance trigger signal (or a trigger signal). Once a trigger signal is received, all the sessions (FDISC and FLOGI) across all the FC links between a network node and a switch are logged out. This forces a re-login for all the sessions. The sessions can then be load balanced across the available interfaces (e.g., Fibre Channel Ports 116-118). This is a very deterministic approach because for every new FC link becoming operational, all the current sessions are logged out. This, however, can cause an undesirably high degree of disruption each time a new FC link is initiated.

Second, session-based load balancing can disrupt selected sessions based on a computational method to minimize session disruptions during load balancing. In this embodiment of load balancing, a load balancing module at a gateway device (e.g., gateway device 110 in FIG. 1) receives an trigger signal (or an indication signal) to load balance a group of sessions associated with a network node and a switch across a group of FC links between a gateway device and the switch at a first time (e.g., when a new FC link becomes operational). The group of sessions includes sessions initiated by a Fibre Channel over Ethernet (FCoE) fabric login (FLOGI) requests and sessions initiated by a Fibre Channel over Ethernet (FCoE) fabric discovery (FDISC) requests. The gateway device can calculate, at a second time after the first time and in response to the indication, a load based on the group of sessions and associated with a first set of links that are in an active configuration before the first time. For example, the load can be the average load associated with the first set of links that are in an active configuration before the first time. The group of sessions is associated with the first set of links at the second time. The gateway device can then calculate a threshold value based on the load. For example, the threshold value can be based on the average load before the first time and a standard deviation associated with the first set of links at the first time. The gateway device can send a signal to cause a set of sessions from the group of sessions to re-establish the set of sessions at a third time after the second time and based on the threshold value such that the set of sessions are load balanced across a second set of links from the set of FC links that are in the active configuration at the third time. The set of sessions to be load balanced can be less than all of the sessions within the group of sessions.

ENode (FLOGI+FDISC)-based load balancing is where the load on an FC link is a function of the number of sessions (FLOGI+FDISC) on that FC link. Any new FLOGI login (e.g., logins by an FCoE port 152, 162, 172 in FIG. 1) is assigned to the FC link with the least load. FDISC logins (e.g., logins by virtual ports 153-155, 163-165, 173-175 in FIG. 1) are assigned to its parent FLOGI link. Five embodiments for ENode-based load balancing are discussed below.

First, ENode-based load balancing can disrupt all current sessions. In this embodiment of load balancing, on receiving an indication for load balancing (e.g., a new FC link becoming operational), the gateway device logs out the existing sessions (FLOGI sessions and FDISC sessions) in the switch. This can force a re-login for the sessions such that the sessions are load balanced on the available interfaces. This, however, causes a high degree of disruption each time a new FC link is initiated. Additionally, the session assignment process is also random, which can make the results difficult to predict. This is especially true when a large variance in the number of FDISCs per FLOGI exists.

One way to mitigate the random nature of session assignment during load balancing is to store the number of FDISC sessions associated with each FLOGI in the memory of the gateway device (e.g., memory 240 in FIG. 2) when logging out the sessions. As FLOGIs are re-assigned to FC links during load balancing, the stored number for that FLOGI can be used to calculate the load on an FC link even if all the FDISCs have not yet logged back in for that FLOGI. The FLOGI can be assigned to an FC link based on a minimum expected load taking into account the number of FIDSC sessions associated with the FLOGI in the previous state and session of the FLOGI. Completely new FLOGIs can be given a count of one as no FIDSCs requests are associated with it.

Second, ENode-based load balancing can involve permutation of FCoE-FC links to achieve absolute minimum load imbalance. This embodiment of load balancing can achieve a minimum load imbalance across all the FC links. For example, this approach can involve minimizing the standard deviation of the loads on the all links (e.g., the links between the ports 116-118 and ports 132-134 in FIG. 1). In this mode of load balancing, the dependency between the FLOGI and FDISC sessions is taken into account. Sessions to be disrupted belong to one or more ENode(s) (e.g., FCoE Ports 152, 162, 172 in FIG. 1) as a whole.

Said in another way, in this embodiment of load balancing, a gateway device is configured to receive, at a first time, an indication signal (or a trigger signal) to load balance across a set of links between the gateway device and a switch a first group of sessions including sessions between a group of network nodes and the switch (FLOGIs) and a second group of sessions including sessions between a group of virtual ports and the switch (FDISCs). Each virtual port from the group of virtual ports is associated with a network node from the group of network nodes. The gateway device is configured to calculate, at a second time after the first time and in response to the indication, a load based on the first group of sessions and the second group of sessions and associated with a set of links that are in the active configuration before the first time. The gateway device configured to calculate, based on the load, a group of link-session profiles associating each session from the first group of sessions with a link from the group of links. Examples of information contained in a link-session profile can include various combinations of ENodes (i.e., FCoE Ports 152, 162, 172 in FIG. 1) and available FC link assignments (i.e., Fibre Channel Ports 116-118 in FIG. 1), the amount of load on each FC link, the bandwidth requirements of each session on an FC link, and/or the like. For each combination of link-session profile, the load imbalance of the system (load balancing profile) is tracked and recorded. The gateway device is configured to select a link-session profile from the group of link-session profiles based on a load balancing profile associated with the link-session profile. The gateway device is configured to send a signal to cause a set of sessions from the first group of sessions to be re-established at a third time after the second time and based on the link-session profile such that each session from the first group of sessions (FLOGIs) and each session from the second group of sessions (FDISCs) are associated with a link from the set of links according to the link-session profile and such that the conditions of minimum load imbalance are fulfilled.

Hence, in this embodiment, the link-session profile that achieves the minimum load imbalance is selected, the necessary FLOGI sessions (ENodes) are logged out, the ENodes are reassigned to new links such that minimum load imbalance can be achieved. While this mode of session re-assignment can achieve the best possible assignment, a high degree of disruption can also occur. Additionally, in some instances, each of the sessions may be logged out to implement the optimal solution and calculating the load imbalance for each link-session profile can also take more time than is desirable.

Third, ENode-based load balancing can involve permutation of link-session profiles to achieve load imbalance under a threshold value and with minimal disruptions. In this embodiment of load balancing, the gateway device is configured to calculate the group of link-session profiles until the link-session profile having the load balancing profile meeting a criterion is identified. The criterion can be, for example, to achieve a minimum disruption with load imbalance under a threshold such as the standard deviation of loads on all links is under a threshold. In this embodiment of load balancing, all combination of link-session profiles are calculated at the gateway device and, for each link-session profile, the associated load imbalance of the system (load balancing profile) is tracked and recorded. From all the combinations of link-session profiles with load imbalance under a threshold, a link-session profile is selected that minimizes the number of session disruptions. Then the associated FLOGI sessions (ENodes) are logged out and the ENodes are re-assigned to new links such that the criterion is satisfied. The "ideal" minimum load imbalance across all the links may not be achieved, but rather load balancing across the links that is "satisfactory" is achieved with the added benefit of lower computational resources and time invested in the load balancing and with minimum session disruptions. Calculating the load balancing profile for each link-session profile, however, can still be time consuming.

Fourth, ENode-based load balancing can involve permutation of link-session profiles within a finite time. In this embodiment of load balancing, the gateway device is configured to calculate the group of link-session profiles for a predetermined time period (e.g., for "n" seconds, where "n" can be any integer number), where each link-session profile from the group of link-session profiles is associated with a load balancing profile from a group of load balancing profiles. Said in another way, for each link-session profile, the associated load imbalance of the system (load balancing profile) is tracked and recorded. The gateway device is configured to select the link-session profile based on the load balancing profile associated with the link-session profile being more optimal or improved (e.g., causes minimum or acceptable possible load imbalance) than the load balancing profile associated with each remaining link-session profile from the group of link-session profiles calculated within the finite time period. Hence, this embodiment of load balancing achieves the minimum possible (or acceptable or reduced) load imbalance across the links in a finite time period. Then the necessary FLOGI sessions (ENodes) are logged out and the relevant ENodes are re-assigned to new links such that the minimum load imbalance criterion is satisfied. As a consequence, the computations can be completed in a pre-determined amount of time. The minimum load imbalance across all the links and/or the maximum number of session disruptions may not be obtained.

Fifth, ENode-based load balancing can involve an approximation method. This embodiment of load balancing can have an approximate allocation of sessions to the links. The ENodes can be sorted based on their FDISC counts, and then the ENode with the greatest number of FDISCs can be assigned to the least loaded link. The ENode with the second most number of FDISCs can be assigned to the least loaded link subsequent to assigning the ENode with the greatest number of FDISCs, and so one until the ENode with the least number of FDISCs is assigned.

Said in another way, in this embodiment of load balancing, a gateway device can receive an indication of a link, from a group of links between the gateway device and a switch, changing from an inactive configuration to an active configuration at a first time. The gateway device can calculate, at a second time after the first time, a load associated with a set of links (1) from the group of links and (2) in the active configuration before the first time. The load can be calculated based on a first group of sessions including sessions between a group of network nodes and the switch, and a second group of sessions including sessions between a group of virtual ports and the switch. Each session from the second group of sessions is associated with a session from the first group of sessions. The gateway device can select a session from the first group of sessions based on that session being associated with a greater number of sessions from the second group of sessions than each remaining session from the first group of sessions. The gateway device can send a signal to cause that session from the first group of sessions to be re-established after the first time such that that session is associated with the link with the lowest load from the group of links after the third time. In some instances, this method can be run in a finite time period and can result in suitable load balance across the FC links. In other instances, however, the level of disruption and imbalance can be high.

In FLOGI-based load balancing, the load on a link is calculated as a function of the number of FLOGI sessions on that link. Any new FLOGI logins are assigned to the link with the least number of FLOGI sessions. An FDISC login is assigned to its parent FLOGI link. FDISC sessions are not considered for load calculation purposes (unlike the ENode based load balancing method). Two embodiments of this load balancing mode are discussed below.

First, FLOGI-based load balancing can involve all sessions being disrupted. In this embodiment of load balancing, when a gateway device receives a trigger signal (or indication signal) to load balance across a group of links between the gateway device and a switch (as described in further detail herein), all the sessions (FDISC and FLOGI) across all the FC links between a network node and a switch are logged out. This forces a re-login for all the sessions. The sessions can then be load balanced across the available interfaces (e.g., Fibre Channel Ports 116-118). This is a very deterministic approach because for every new FC link becoming operational, all the current sessions are logged out. This, however, can cause an undesirably high degree of session disruption each time a new link is initiated. This embodiment is similar to that of the first embodiment of session-based load balancing as described previously except FLOGI sessions are used to calculate load on a link (instead of both FLOGI and FDISC).

Second, FLOGI-based load balancing can involve selected sessions being disrupted and is similar to the embodiment of selected sessions disruption for session-based load balancing as described previously, with the exception that the FLOGI sessions are involved in the load calculation for each link (instead of both FLOGI and FDISC). This embodiment of load balancing involves the gateway device sending a signal to remove a session on the link based on the load associated with the link and a threshold value (that is determined based on the load) such that the session is associated with the new link when logging in again. This embodiment of load balancing can handle links that have capacity less than the average load calculated when determining the new load balanced distribution. When a link reaches capacity and is still below the average capacity for the links, that link and its load can be removed from consideration (i.e., the load balancing calculations involve one less link), and the average remaining load can be re-calculated and sessions can again be re-assigned based on the calculations. When a link reaches capacity and is less than the average load, the load balancing calculation can be repeated. The number of ENodes (FLOGIs) are considered and not the FDISCs associated with the ENodes when performing load balancing calculations. Hence, in some instances, some sessions (both FLOGI and FDISC) that were logged out possibly cannot login if a session limit on that new link is reached. This might occur if a large asymmetry in the ENode-FDISC count exists.

In some instances, various trigger signals (or indication signals) can be used to trigger the execution of a load balancing process. Such trigger signals that can be used to trigger load balancing can result from at least one of the following three conditions. In one example, where the auto-load balance mode is configured, if the existing load is not balanced (e.g., within a pre-defined threshold), a trigger signal can be sent load balancing (or load rebalancing) can automatically occur. In such examples, if the existing load is already balanced (e.g., within a pre-defined threshold), a trigger signal is not sent and no new balancing steps are implemented; hence, no current sessions are disrupted.

In another example, a trigger signal (or indication signal) can be generated when the auto-load balance mode is already configured, and a new FC link becomes operational. In such events, load balancing takes place. In yet another example, load balancing can be initiated by an on-demand request command such as, for example, by a network administrator via a command line interface (CLI). In such examples, if the existing load is not balanced (e.g., within a pre-defined threshold), a trigger signal can be sent and load balancing will occur. In such examples, if the existing load is already balanced (e.g., within a pre-defined threshold), a trigger signal is not sent and no new load balancing steps are implemented; hence, no current sessions are disrupted.

In some instances, upon receiving a trigger signal (or indication signal), a load-balance timer (e.g., 10 seconds) can be initiated and/or started in, for example, the gateway device. In such embodiments, load balancing can start after expiration of this timer. By having the timer, multiple events (e.g., flapping links, new links being activated, etc.) within the time period that would otherwise cause multiple rebalances can be aggregated into a single balance event. This can minimize or reduce the number of balancing iterations performed and thus can minimize or reduce the number of session disruptions that can occur due to multiple load balancing iterations. In some instances, the length of this timer can be configured by a network administrator. In some instances, if a second trigger signal occurs within the time period associated with the timer, the timer can be reset to its initial value (e.g., 10 seconds). Thus, if multiple trigger signals occur, the timer can cause the gateway device (e.g., gateway device 110 in FIG. 1) to wait before balancing the load.

In some instances, a maximum time period (e.g., 30 seconds) since the first trigger signal (or indication signal) can be used such that if the maximum time period has expired, the load balancing process is performed regardless of the presence of other trigger signals. In some instances, the maximum time period can be configured by a network administrator. In some instances, new trigger signals can occur while a current load balancing process is in progress. In such instances, rebalancing from the new trigger signals can be deferred until after the current load balancing is completed. In other instances, additional rebalancing request commands (e.g., from a network administrator via a CLI) occurring while a current load balancing process is in progress can be rejected. In some instances, the load-balance timer (that tracks the maximum time period after the current trigger signal) is started when a non-CLI trigger signal (i.e., not initiated by a network administrator) is received, but is not started when a CLI trigger signal (i.e., executed by a network administrator) is received. In such instances, a CLI trigger signal can start the load balancing process without delay. In other instances, the load-balance timer is started with a CLI trigger signal, but is not started with a non-CLI trigger signal.

In some instances, if the conditions that lead to the trigger signal do not exist upon expiration of the load-balance timer, the load balancing process can be canceled. Such a situation can arise when the trigger signal that initiated the load-balance timer is no longer valid when the timer expires. For example, an FC link becomes operational, which leads to the initiation of the load-balance timer, and then the FC link goes down or becomes inoperative before timer expires. In such cases, on the expiry of the load-balance timer, if no other trigger signals are queued, the load balancing process does not proceed. In other instances, new sessions (e.g., FLOGIs and/or FDISCs) initiated after the load-balance timer has started but prior to commencement of the load balancing process are processed normally, because the load balancing process starts only after the load-balance timer expires and hence the gateway device can include the new sessions and the old sessions in the load balancing process.

In some configurations, a software simulation of the load balancing process can be implemented. For example, a network administrator can initiate a simulation to determine what results this would produce (e.g., simulation of different sets of link-session profiles). In such configurations, the network administrator can use the simulation results to determine the feasibility and the practical usefulness of performing load balancing. For example, the simulations results can generate information associated with the computational resources that can be consumed during load balancing, the number of session disruptions from implementing load balancing, the time consumed from implementing load balancing, and/or the like. In some configurations, this simulation can be run during the time period following the trigger signal In some instances, a user such as, for example, a network administrator can select the load balancing embodiment to implement. For example, the network administrator can select (e.g., via a CLI) the load balancing embodiment to implement (e.g., session-based load balancing, or ENode-based load balancing, or FLOGI-based load balancing). Similarly, in some instances, the network administrator can select which trigger signals will initiate load balancing method. For example, the network administrator can select a first load balancing embodiment to execute on a first trigger signal and a second load balancing embodiment to execute on a second trigger signal. Thus, the network administrator can cause multiple load balancing embodiments to be run in different situations and/or scenarios.

In some instances, auto-load-balance has no impact on FCoE Crash Dump (FCD) crash and is disabled while restoration is occurring. Hence, sessions would stay as is before and after FCD restart. If, however, a CLI request to load balance occurred while the restore steps are in progress, the load balance method can be implemented after the restore steps are completed.

While shown and described above as being dependent on the number of sessions (FLOGIs and/or FDISCs), in other instances, the load on a link can be a function of the link speed, bandwidth and/or the like. In some instances, for example, the load on the link can be a function of the link speed, bandwidth, and number of sessions and/or any other parameter affecting the transfer of data units and/or control units. In some instances, if both FLOGI and FDISC sessions are being restarted, a preference can be defined to first restart and/or rebalance FDISC sessions prior to FLOGI sessions. This can be made to minimize any unnecessary disruption caused to the FDISC sessions associated with a FLOGI session.

FIG. 4 is a flowchart illustrating a method for load balancing a group of sessions associated with a network and a switch across a group of links, according to an embodiment. The method 400 includes receiving at, for example, a load balancing module of a gateway device, an indication to load balance a group of sessions associated with a network node and a switch across a group of (Fibre Channel—FC) links between the gateway device and the switch at a first time, at 402. As described above, the gateway device is operatively coupled to the switch via a group of links. The network node can be, for example, a Fibre Channel over Ethernet (FCoE) node (ENode) and the switch can be a Fibre Channel (FC) switch. As described above, there are several methods to load balance a group of communication sessions such as, for example, session-based load balancing, ENode-based load balancing and FLOGI-based load balancing.

At 404, a load is calculated at a second time after the first time at, for example, the load balancing module of a gateway device that is based on the group of sessions and associated with a first set of links from the group of links that were in an active configuration before the first time. For example, in some instances, the load calculated can be the average load associated with the set of links. The group of sessions is associated with the first set of links at the second time. As described above, the group of sessions can include sessions initiated by Fibre Channel over Ethernet (FCoE) fabric login (FLOGI) requests and sessions initiated by Fibre Channel over Ethernet (FCoE) fabric discovery (FDISC) requests. Additionally, as described above, the group of sessions can include, for example, an FCoE-FC link. As described above, in some instances, the load on a link can be calculated as a function of the number of sessions on the link (either only FLOGI sessions or a combination of FLOGI and FDISC sessions). In other instances, the load on the link can be a calculated as a function of the link speed, bandwidth, number of sessions and/or any other parameter affecting the transfer of data units and/or control units.

At 406, a threshold value is calculated based on the load at, for example, the load balancing module of the gateway device. In some instances, the threshold value can be based on the average load and a standard deviation associated with the first set of links. In other instances, the threshold value can be based on a fraction of the average load (e.g., 20% greater than the average load).

At 408, a signal is sent from, for example, the gateway device, that causes a set of sessions from the group of sessions to re-establish the set of sessions at a third time after the second time and based on the threshold value such that the set of sessions are load balanced across a second set of links in active configuration at the third time. As described above, in some instances the process of load balancing is continued until the absolute minimal load imbalance across all the links is achieved. Such instances can involve large amounts of computational resources and time and can also lead to large number of session disruptions. In other instances, the process of load balancing is continued for a finite time period. In such instances, the load balancing may not necessarily lead an absolute minimum load imbalance across all the links, but it can generate a load imbalance across the links that is satisfactory and can limit the amount of time and computational resources involved in the load balancing process.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A non-transitory processor-readable medium storing code representing instructions to be executed by a processor, the code comprising code to cause the processor to:

receive, at a gateway device and in response to a first triggering event, a first indication to load balance a plurality of active sessions associated with a network node and a switch across a plurality of links between the gateway device and the switch at a first time, the plurality of active sessions being active before the first time;

receive, at the gateway device and in response to a second triggering event in which a link, from the plurality of links, changes from an inactive configuration to an active configuration, a second indication to load balance the plurality of active sessions across the plurality of links, the plurality of active sessions including (1) a first plurality of active sessions between the network node and the switch and (2) a second plurality of active sessions between a plurality of virtual ports and the switch, each session from the second plurality of active sessions being associated with a session from the first plurality of active sessions;

(1) in response to the first indication,
  calculate, at a second time after the first time, a load that is a number of a set of sessions from the plurality of active sessions and associated with a first set of links (1) from the plurality of links and (2) in the active configuration before the first time, the set of sessions being associated with the first set of links at the second time;
  calculate a threshold value based on the load; and
  send, from the gateway device to the switch, a first login signal to initiate a reestablishment of the set of sessions from the plurality of active sessions with a second set of links from the plurality of links, at a third time after the second time and based on the threshold value, the second set of links being in the active configuration at the third time, the plurality of links including the first set of links and the second set of links different from the first set of links,
(2) in response to the second indication,
  select a session from the first plurality of active sessions based on that session being associated with a greater number of sessions from the second plurality of active sessions than each remaining session from the first plurality of active sessions; and
  send, from the gateway device to the switch, a second login signal to initiate a reestablishment of that session from the first plurality of active sessions with the link from the plurality of links.

2. The non-transitory processor-readable medium of claim 1, wherein:
the network node is included in a plurality of a Fibre Channel over Ethernet (FCoE) nodes (ENodes),
the set of sessions includes a session initiated by an ENode from the plurality of ENodes, the set of sessions does not include a session initiated by an FCoE virtual NPort (VNPort) associated with the ENode.

3. The non-transitory processor-readable medium of claim 1, wherein the network node is a Fibre Channel over Ethernet (FCoE) node (ENode), the set of sessions includes a session initiated by the ENode and a session initiated by an FCoE virtual N_Port (VNPort) associated with the ENode.

4. The non-transitory processor-readable medium of claim 1, wherein the load is an average load associated with the first set of links, the code to cause the processor to calculate the threshold value includes code to cause the processor to calculate the threshold value based on the average load and a standard deviation associated with the first set of links.

5. The non-transitory processor-readable medium of claim 1, wherein the set of sessions includes a session initiated by a Fibre Channel over Ethernet (FCoE) fabric login (FLOGI) request and a session initiated by a Fibre Channel over Ethernet (FCoE) fabric discovery (FDISC) request.

6. The non-transitory processor-readable medium of claim 1, wherein the set of sessions includes a session initiated by a Fibre Channel over Ethernet (FCoE) fabric login (FLOGI) request, the set of sessions does not include a session initiated by a Fibre Channel over Ethernet (FCoE) fabric discovery (FDISC) request.

7. The non-transitory processor-readable medium of claim 1, wherein the switch is a Fibre Channel (FC) switch.

8. The non-transitory processor-readable medium of claim 1, wherein the code to cause the processor to calculate the load includes code to cause the processor to calculate the load based on a bandwidth use associated with the first set of links.

9. An apparatus, comprising:
a gateway device configured to receive a first indication in response to a first triggering event to load balance a plurality of active sessions associated with a network node and a switch across a plurality of links between the gateway device and the switch,
the gateway device configured to receive a second indication in response to a second triggering event in which a link, from the plurality of links, changes from an inactive configuration to an active configuration at a first time,
(1) in response to the first indication,
  the gateway device configured to calculate a load that is a number of a set of sessions from the plurality of active sessions and associated with a first set of links from the plurality of links,
  the gateway device configured to calculate a threshold value based on the load,
  the gateway device configured to send a first login signal to initiate a reestablishment of the set of sessions from the plurality of active sessions with a second set of links from the plurality of links, based on the threshold value, the plurality of links including the first set of links and the second set of links different from the first set of links,
(2) in response to the second indication,
  the gateway device configured to calculate, at a second time after the first time, a load associated with a set of links (1) from the plurality of links and (2) in the active configuration before the first time, the load being based on the plurality of active sessions having a first plurality of active sessions between a plurality of network nodes and the switch and a second plurality of active sessions between a plurality of virtual ports and the switch, each session from the second plurality of active sessions being associated with a session from the first plurality of active sessions, the first plurality of active sessions and the second plurality of active sessions being active before the first time,
  the gateway device configured to select a session from the first plurality of active sessions based on that session being associated with a greater number of sessions from the second plurality of active sessions than each remaining session from the first plurality of active sessions,
  the gateway device configured to send a second login signal to initiate a reestablishment of that session from the first plurality of active sessions with the link from the plurality of links.

10. The apparatus of claim 9, wherein each network node from the plurality of network nodes is a Fibre Channel over Ethernet (FCoE) node (ENode), each virtual port from the plurality of virtual ports is an FCoE virtual NPort (VNPort).

11. The apparatus of claim 10, wherein the first plurality of active sessions are initiated by a Fibre Channel over Ethernet (FCoE) fabric login (FLOGI) request and the second plurality of active sessions are initiated by a Fibre Channel over Ethernet (FCoE) fabric discovery (FDISC) request.

12. The apparatus of claim 11, wherein the switch is a Fibre Channel (FC) switch.

13. The non-transitory processor-readable medium of claim 1, wherein the code includes code to cause the processor to:
   determine the number of the set of sessions;
   disconnect, based on the number of the set of sessions, the set of sessions on the first set of links, prior to the reestablishment of the set of sessions with the second set of links.

14. A method, comprising:
   receiving a first indication, in response to a first triggering event, to load balance a plurality of active sessions associated with a network node and a switch across a plurality of links between a gateway device and the switch at a first time, the plurality of active sessions being active before the first time;
   receiving, in response to a second triggering event in which a link, from the plurality of links, changes from an inactive configuration to an active configuration, a second indication to load balance the plurality of active sessions, the plurality of active sessions including (1) a first plurality of active sessions between the network node and the switch and (2) a second plurality of active sessions between a plurality of virtual ports and the switch, each session from the second plurality of active sessions being associated with a session from the first plurality of active sessions,
   (1) in response to the first indication,
      calculating, at a second time after the first time, a load that is a number of a set of sessions from the plurality of active sessions associated with a first set of links (1) from the plurality of links and (2) in the active configuration before the first time, the set of sessions being associated with the first set of links at the second time;
      calculating a threshold value based on the load; and
      sending a first login signal to initiate a reestablishment of the set of sessions from the plurality of active sessions with a second set of links from the plurality of links, at a third time after the second time and based on the threshold value, the second set of links being in the active configuration at the third time, the plurality of links including the first set of links and the second set of links different from the first set of links,
   (2) in response to the second indication,
      selecting a session from the first plurality of active sessions based on that session being associated with a greater number of sessions from the second plurality of active sessions than each remaining session from the first plurality of active sessions; and
      sending, from the gateway device to the switch, a second login signal to initiate a reestablishment of that session from the first plurality of active sessions with the link from the plurality of links.

15. The method of claim 14, wherein the network node is included in a plurality of a Fibre Channel over Ethernet (FCoE) nodes (ENodes), the set of sessions includes a session initiated by an ENode from the plurality of ENodes, the set of active sessions does not include a session initiated by an FCoE virtual N_Port (VNPort) associated with the ENode.

16. The method of claim 14, wherein the network node is a Fibre Channel over Ethernet (FCoE) node (ENode), the set of sessions includes a session initiated by the ENode and a session initiated by an FCoE virtual N_Port (VNPort) associated with the ENode.

17. The method of claim 14, wherein:
   the load is an average load associated with the first set of links,
   calculating the threshold value includes calculating the threshold value based on the average load and a standard deviation associated with the first set of links.

18. The method of claim 14, wherein the set of sessions includes a session initiated by a Fibre Channel over Ethernet (FCoE) fabric login (FLOGI) request and a session initiated by a Fibre Channel over Ethernet (FCoE) fabric discovery (FDISC) request.

* * * * *